United States Patent
Brey et al.

(10) Patent No.: US 7,484,116 B2
(45) Date of Patent: Jan. 27, 2009

(54) APPARATUS, SYSTEM, AND METHOD FOR ACCESSING REDUNDANT DATA

(75) Inventors: Thomas M. Brey, Cary, NC (US);
Dinesh Chandra Coca, Tucson, AZ (US); Darren Christopher Douglas, Tucson, AZ (US); Hiroyuki Miyoshi, Kawasaki (JP); Yoshihiko Terashita, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 507 days.

(21) Appl. No.: 11/324,591

(22) Filed: Jan. 3, 2006

(65) Prior Publication Data
US 2007/0174667 A1    Jul. 26, 2007

(51) Int. Cl.
*G06F 11/00* (2006.01)
(52) U.S. Cl. .......................................... 714/5; 711/100
(58) Field of Classification Search ............... 714/5, 714/6, 7, 8, 11–13, 42, 54; 711/100, 163, 711/167, 170
See application file for complete search history.

(56) References Cited

U.S. PATENT DOCUMENTS

| | | | |
|---|---|---|---|
| 6,091,658 A | 7/2000 | McDonald et al. | 365/228 |
| 6,278,643 B1 * | 8/2001 | Penney | 365/200 |
| 6,564,348 B1 | 5/2003 | Barenys et al. | 714/732 |
| 6,668,345 B1 * | 12/2003 | Ooishi et al. | 714/710 |
| 6,981,171 B2 * | 12/2005 | Hashemi | 714/5 |
| 7,082,549 B2 * | 7/2006 | Rao et al. | 714/6 |
| 7,360,118 B1 * | 4/2008 | Fesler | 714/36 |
| 2002/0073358 A1 * | 6/2002 | Atkinson | 714/21 |
| 2002/0133759 A1 | 9/2002 | Bailey et al. | 714/54 |
| 2003/0158870 A1 | 8/2003 | Goodman | 707/203 |
| 2005/0007838 A1 | 1/2005 | Makela et al. | 365/199 |
| 2005/0085222 A1 | 4/2005 | Przybilski et al. | 455/418 |
| 2005/0160312 A1 * | 7/2005 | Seng et al. | 714/13 |

* cited by examiner

*Primary Examiner*—Dieu-Minh Le
(74) *Attorney, Agent, or Firm*—Kunzler & McKenzie (57) ABSTRACT

An apparatus, system, and method are disclosed for accessing redundant data. A verification value module calculates a first verification value for a first redundant memory. In addition, the verification value module calculates a second verification value for a second redundant memory. In one embodiment, a validation module validates the first and second verification values. A selection module accesses the first redundant memory if the first verification value is equivalent to the second verification value. In a certain embodiment, the selection module identifies and accesses the redundant memory with a most advanced generation count if the first and second verification values are valid and are not equivalent.

14 Claims, 6 Drawing Sheets

APPARATUS, SYSTEM, AND METHOD FOR ACCESSING REDUNDANT DATA

BACKGROUND OF THE INVENTION

1. Field of the Invention

This invention relates to redundant data and more particularly relates to accessing redundant vital product data.

2. Description of the Related Art

Many data processing systems include redundant components. Redundant components share one or more functions. If a first redundant component fails, a second redundant component may continue to perform the first and second redundant components' function. Redundant components eliminate single points of failure within a data processing system. That is, each component that shares a function must fail before the function is unavailable. Eliminating single points of failure increases the reliability and reduces down time for data processing systems.

A data processing system may include a redundant memory. In one embodiment the redundant memory stores vital product data ("VPD"). The VPD may include data critical to the operation of one or more components of the data processing system. For example, the VPD may record data such as a firmware revision level, a basic input/output software ("BIOS") revision level, one or more worldwide port numbers ("WWPN"), and communication port characteristics.

One or more elements of the data processing system may include a redundant memory. For example, a blade center data processing system may comprise a plurality of blades configured as servers, data storage devices, and the like. Each blade may include a redundant memory with VPD describing the blade's configuration. When a blade is added to the blade center, a hardware or software process may query the VPD stored in the blade's redundant memory to determine how to configure the blade, how to communicate with the blade, and/or the function of the blade.

Unfortunately, redundant memories have continued as single point of failure components within data processing systems. Data processing systems cannot always distinguish when a redundant memory has failed, and which of two or more redundant memories should be used. As a result, redundant memories remain a potential for single point failures.

From the foregoing discussion, it should be apparent that a need exists for an apparatus, system, and method that accesses redundant data. Beneficially, such an apparatus, system, and method would support redundant memories including redundant VPD memories.

SUMMARY OF THE INVENTION

The present invention has been developed in response to the present state of the art, and in particular, in response to the problems and needs in the art that have not yet been fully solved by currently available redundant data access methods. Accordingly, the present invention has been developed to provide an apparatus, system, and method for accessing redundant data that overcome many or all of the above-discussed shortcomings in the art.

The apparatus to access redundant data is provided with a plurality of modules configured to functionally execute the necessary steps of calculating a first verification value, calculating a second verification value, and accessing a first redundant memory if the first verification value is equivalent to the second verification value. These modules in the described embodiments include a verification value module and a selection module. In one embodiment, the apparatus also includes a validation module.

The verification value module calculates a first verification value for a first redundant memory and a second verification value for a second redundant memory. In one embodiment, the first and second verification values are checksums. The verification value module may calculate each checksum by summing each data word for each redundant memory.

In one embodiment, the validation module validates the first and second verification values. For example, the validation module may compare the first verification value with a first stored value and validate the first verification value if the first verification value and the first stored value are equivalent. Similarly, the validation module may compare the second verification value with a second stored value and validate the second verification value if the second verification value and the second stored value are equivalent.

The selection module accesses the first redundant memory if the first verification value is equivalent to the second verification value. In addition, the selection module may access the second redundant memory if the first redundant memory has an invalid verification value and the second redundant memory has a valid verification value else the selection module may access the first redundant memory if the first redundant memory has a valid verification value and the second redundant memory has an invalid verification value. The apparatus accesses the first and second redundant memories, assuring that valid, consistent data is accessed.

A system of the present invention is also presented to access redundant data. The system may be embodied in data processing system such as a blade center. In particular, the system, in one embodiment, includes a blade center configured to mount a plurality of blades and at least one blade mounted in the blade center and configured with a first and second redundant memory and a controller module. The controller module comprises a verification module and a selection module. In addition, the controller module may comprise a communication module.

The blade server may be configured with a chassis. The chassis may receive one or more blades. In one embodiment, the blade server includes a management module that communicates with each blade through a backplane bus. Each blade may be configured as a data processing device such as a server, a data storage device such as a hard disk drive, a communications device, or the like. Blades may be added to or removed from the blade center to modify the configuration and capabilities of the blade center. In addition, failed blades may be replaced, simplifying blade center maintenance.

In one embodiment, the management module communicates with the controller module of a blade. The management module may access the first and second redundant memory through the controller module. During the redundant memory access, the verification value module of the controller module calculates a first verification value for the first redundant memory and a second verification value for the second redundant memory. The selection module of the controller module accesses the first redundant memory if the first verification value is equivalent to the second verification value, providing the redundant data to the management module or another requesting device.

In one embodiment, the communication module communicates the status of the redundant data access. For example, the communication module may communicate a failure to read from the first or second redundant memory. The system assures that accesses to the first and second redundant memories retrieves valid, consistent data.

A method of the present invention is also presented for accessing redundant data. The method in the disclosed embodiments substantially includes the steps necessary to carry out the functions presented above with respect to the operation of the described apparatus and system. In one embodiment, the method includes calculating a first verification value, calculating a second verification value, and accessing a first redundant memory if the first verification value is equivalent to the second verification value. The method also may include validating the first and second verification values.

A verification value module calculates a first verification value for a first redundant memory. In addition, the verification value module calculates a second verification value for a second redundant memory. In one embodiment, a validation module validates the first and second verification values. A selection module accesses the first redundant memory if the first verification value is equivalent to the second verification value. In one embodiment, the selection module identifies and accesses the redundant memory with a most advanced generation count if the first and second verification values are valid and are not equivalent. The method accesses valid, consistent data from redundant memories.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention accesses redundant data including redundant VPD data. In addition, the embodiment of the present invention validates the data and assures the data's consistency. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal-bearing medium may take any form capable of generating a signal, causing a signal to be generated, or causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
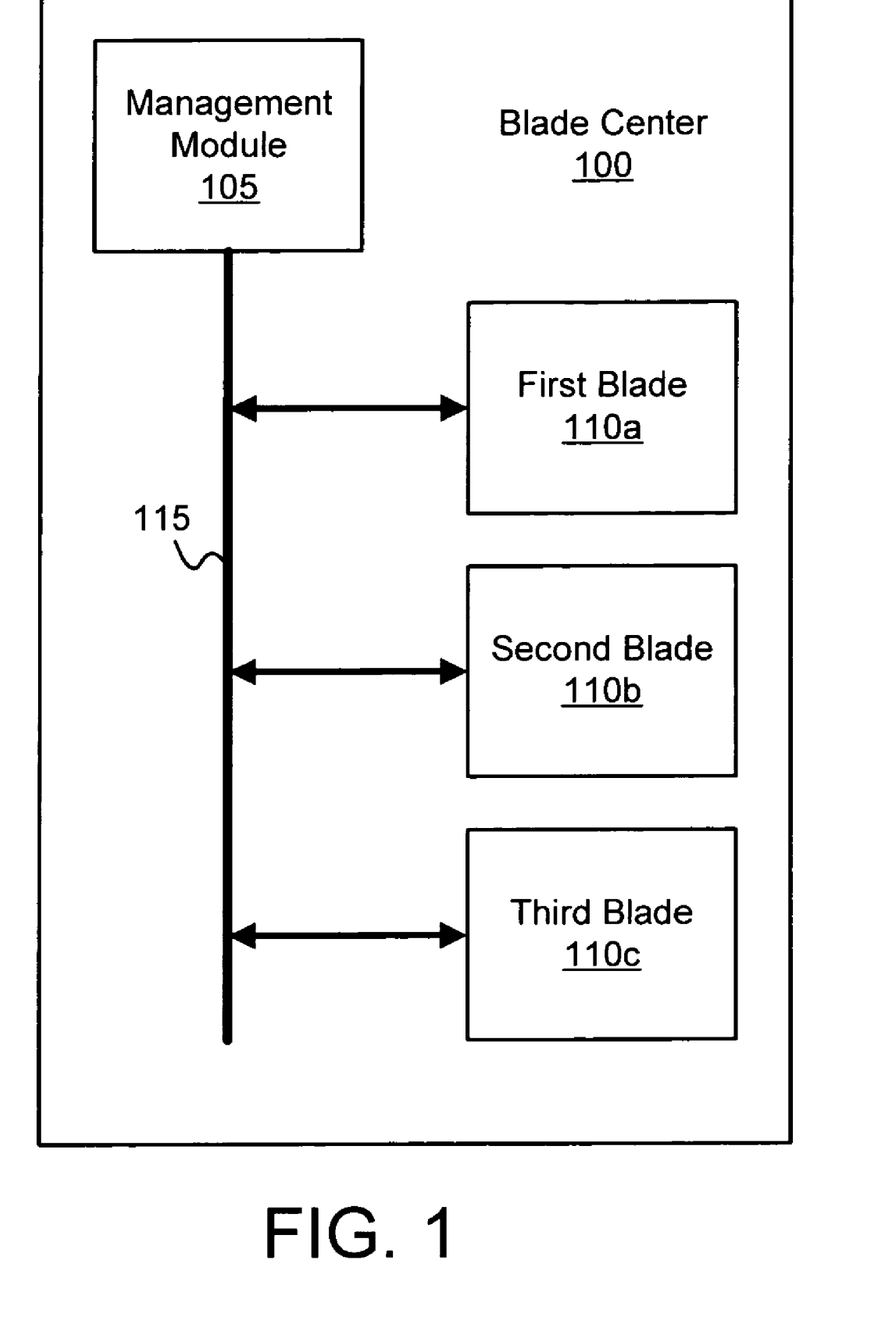
FIG. 1 is a schematic block diagram illustrating one embodiment of a blade center in accordance with the present invention.

FIG. 1 is a schematic block diagram illustrating one embodiment of a blade center 100 of the present invention. The blade center 100 includes a management module 105, one or more blades 110, and a backplane bus 115. Although for simplicity the blade center 100 is depicted with three blades 110, any number of blades 110 may be employed. In one embodiment, the blade center 110 an eServer Blade Center manufactured by International Business Machines ("IBM") of Armonk, N.Y.

The blade center 100 may be configured with a chassis. In one embodiment, the chassis comprises one or more slots each configured with connectors and mounting devices for receiving a blade 110. In one embodiment, the management module 105 manages the blade center 100 operations. For example, the management module 105 may assign tasks to one or more blades 110, perform diagnostics on the blades 110, and manage the replacement, additional, or remove of blades 110. The management module 105 may communicates with each blade 110 through the backplane bus 115. In one embodiment, the backplane bus 115 is a RS 485 bus.

Each blade 110 may be configured as a data processing device such as a server, a data storage device such as a hard disk drive, a communications device, or the like. For example, the first blade 110a may comprise four processors operating as symmetric multiprocessors with local memory while the second blade 110b may comprise a plurality of hard disk drives operating as a redundant array of independent disks ("RAID") memory system. An operator may add to or remove blades 110 from the blade center 100 to modify the configuration and capabilities of the blade center 100. For example, the operator may add a blade 110 configured as a server to increase the processing power of the blade center 100.

Each blade 110 may include a redundant memory. In one embodiment, the redundant memory stores VPD. The VPD in the redundant memory may include a blade 110 product code, a BIOS version, a number and configuration of processors on the blade 110, a number and configuration of hard disks, a firmware version, one or more WWPN, configuration protocols, and the like. The management module 105 may use the VPD to configure and communicate with the blade 110.

Failed blades 110 may be replaced, simplifying blade center 100 maintenance. For example, if the second blade 110b failed, the management module 105 may withdraw tasks from the second blade 110b and notify the operator to replace the second blade 110b. The blade center 100 may continue to operate while the operator removes the second blade 110b and installs a replacement blade 110 in the second blade's 110b slot.

Although blades 110 may be replaced, the cost of operating the blade center 110 is reduced if blades 110 fail less frequently. As a result, blades 110 may include redundant components for each blade 110 function. Redundant components eliminate single points of failure for the blade 110 as each redundant component must fail before the component's function is not available to the blade 110.

In the past, redundant memories have not been employed because of the difficulties in determining which of one or more redundant memories failed or stored corrupted data. The embodiment of the present invention accesses a first and second redundant memory and retrieves valid, consistent data.

Figure 2:
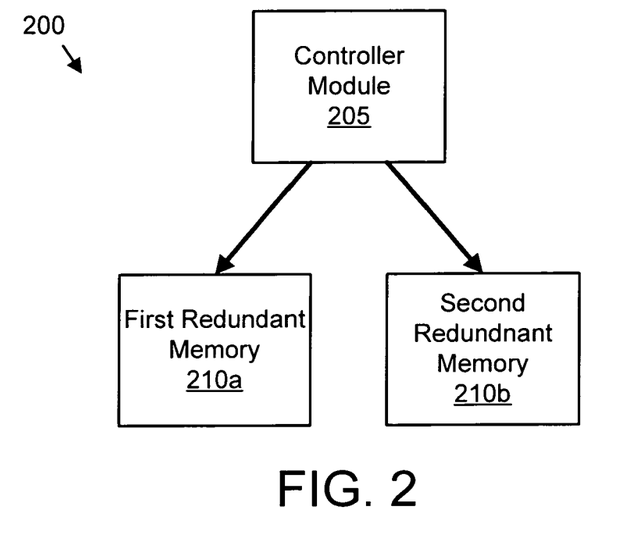
FIG. 2 is a schematic block diagram illustrating one embodiment of a redundant data system of the present invention.

FIG. 2 is a schematic block diagram illustrating one embodiment of a redundant data system 200 of the present invention. The system 200 includes a controller module 205 and one or more redundant memories. A blade 110 such as the blade 110 of FIG. 1 may comprise the system 200.

In one embodiment, the controller module 205 manages one or more functions for the blade 110. For example, the controller module 205 may manage storing data to and retrieving data from one or more hard disk drives. The controller module 205 may also be in communication with a management module 105 such as the management module of FIG. 1. As depicted, the controller module 205 is in communication with a first and second redundant memory 210a, 210b.

In one embodiment, the management module 105 requests data such as VPD from the controller module 205 over a backplane bus 115 such as the backplane bus 115 of FIG. 1. The controller module 205 may retrieve the data from the first and second redundant memories 210a, 210b by communicating with the redundant memories 210.

Figure 3:
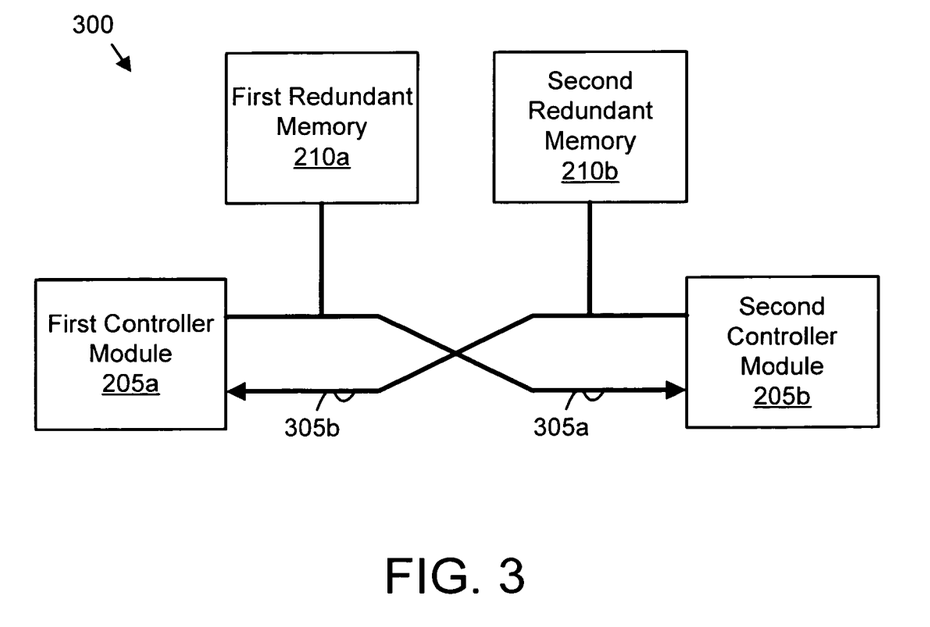
FIG. 3 is a schematic block diagram illustrating one alternate embodiment of a redundant data system of the present invention.

FIG. 3 is a schematic block diagram illustrating one alternate embodiment of a redundant data system 300 of the present invention. The system 300 includes one or more controller modules 205 and one or more redundant memories 210. Although for simplicity the system 300 is depicted with two controller modules 205 and two redundant memories 210, any plurality of controller modules 205 and redundant memories 210 may be employed.

The depicted first and second controller module 205a, 205b may be the controller module 205 of FIG. 2. In one embodiment, the first controller module 205a is configured as a master controller and the second controller module 205b is configured as a slave controller. The first controller module 205a may direct the operation of the second controller module 205b.

In the depicted embodiment, the first and second controller module 205a, 205b communicate over a first and second communication channel 305a, 305b. In one embodiment, each communication channel 305 is an Inter-IC bus or I2C bus as is well known to those skilled in the art. In a certain embodiment, the first controller module 205a is the master and the second controller module 205b is the slave for the first communication channel 305a and the second controller module 205b as the master and the first controller module 205a is the slave for the second communication channel 305b. Thus the first controller module 205a controls communications over the first communication channel 305a and the second controller module 205b controls communications over the second communication channel 305b.

In one embodiment, a management module 105 such as the management 105 of FIG. 1 communicates with the first controller module 205a over a backplane bus 115 such as the backplane bus 115 of FIG. 1. The management module 105 may request the first controller module 205a retrieve data such as VPD. In one embodiment, the first controller module 205a communicates with the first redundant memory 210a through the first communication channel 305a. For example, the first controller module 205a may read the contents of the first redundant memory 210a through the first communication channel 305a.

In addition, the first controller module 205a may direct the second controller module 205b to communicate with the second redundant memory 210b. For example, first controller module 205a may direct the second controller module 205b to read the contents of the second redundant memory 205b through the second communication channel 305b and communicate the contents to the first controller module 205a through the second communication channel 305b.

Figure 4:
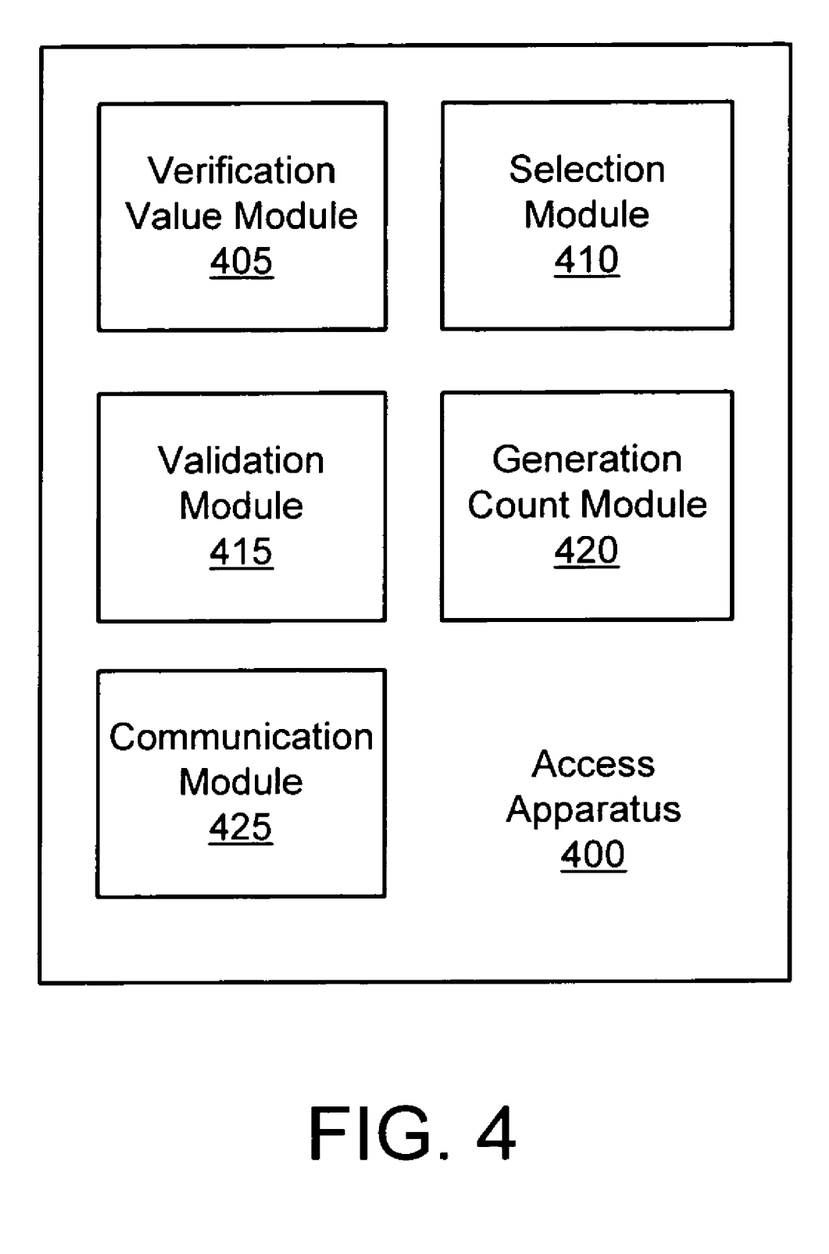
FIG. 4 is a schematic block diagram illustrating one embodiment of an access apparatus of the present invention.

FIG. 4 is a schematic block diagram illustrating one embodiment of an access apparatus 400 of the present invention. The apparatus 400 includes a verification value module 405, a selection module 410, a validation module 415, a generation count module 420, and a communication module 425. In one embodiment, the apparatus 400 is comprised by the controller module 205 of FIGS. 2 and 3. In addition, elements of FIGS. 1-3 are referenced.

The verification value module 405 calculates a first verification value for a first redundant memory 210a and a second verification value for a second redundant memory 210b. In one embodiment, the first and second verification values are checksums. The verification value module 405 may calculate each checksum by summing each data word for each redundant memory 210. In an alternate embodiment, the verification value module 405 calculates each checksum by cumulatively performing a logical exclusive OR operation on each data word for each redundant memory 210 as is well known to those skilled in the art.

In one embodiment, the validation module 415 validates the first and second verification values. For example, the validation module 415 may compare the first verification value with a first stored value and validate the first verification value if the first verification value and the first stored value are equivalent. Similarly, the validation module 415 may compare the second verification value with a second stored value and validate the second verification value if the second verification value and the second stored value are equivalent.

The selection module 410 accesses the first redundant memory 210a if the first verification value is equivalent to the second verification value. In addition, the selection module 410 may access the second redundant memory 210b if the first redundant memory 210a has an invalid first verification value and the second redundant memory 210b has a valid second verification value else the selection module 410 may access the first redundant memory 210a if the first redundant memory 210a has a valid first verification value and the second redundant memory 210b has an invalid second verification value. The apparatus 400 accesses the first and second redundant memories 210a, 201b, assuring that valid, consistent data is accessed.

In one embodiment, the generation count module 420 increments a generation count stored on each redundant memory 210 each time the redundant memory 210 is updated. For example, the generation count module 420 may read the generation count stored on the redundant memory 210, increment the generation count value by a specified value such as one, and write the incremented generation count to the redundant memory 210.

In one embodiment, the communication module 425 communicates the status of an access to the redundant memory 210. For example, if selection module 410 successfully accessed the first redundant memory 210a, the communication module 425 may communicate a notice to the management module 105 of FIG. 1 that the access was successful. The apparatus 400 selects verified data from redundant memories 210a, and may further validate the data.

Figure 5:
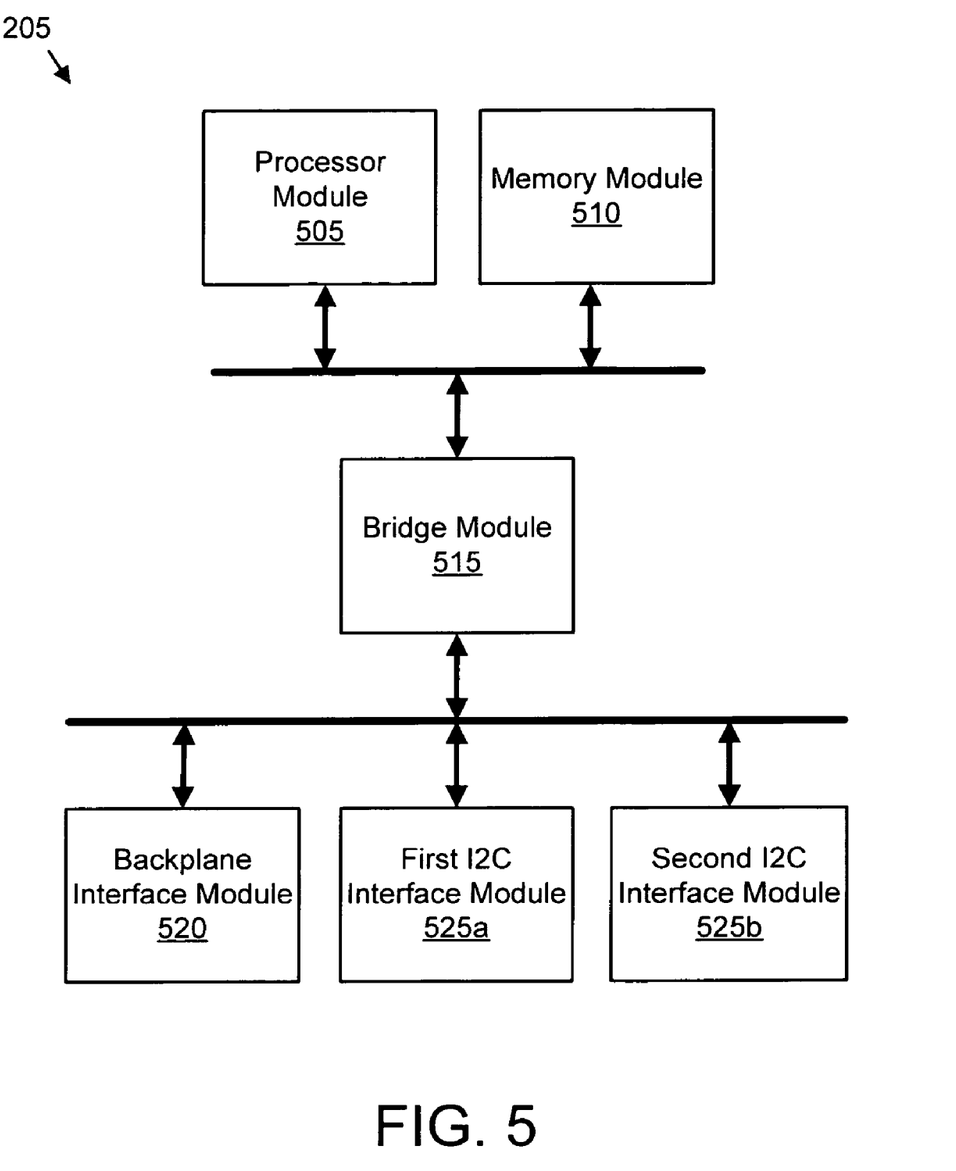
FIG. 5 is a schematic block diagram illustrating one embodiment of a controller module of the present invention.

FIG. 5 is a schematic block diagram illustrating one embodiment of a controller module 205 of the present invention. The controller module 205 may be the controller module 205 of FIGS. 2 and 3. As depicted, the controller module 205 includes a processor module 505, a memory module 510, a bridge module 515, a backplane interface module 520, and one or more I2C interface modules 525.

The processor module 505, memory module 510, bridge module 515, backplane interface module 520, and I2C interface modules 525 may be fabricated of semiconductor gates on one or more semiconductor substrates. Each semiconductor substrate may be packaged in one or more semiconductor devices mounted on circuit cards. Connections between the processor module 505, the memory module 510, the bridge module 515, the backplane interface module 520, and the I2C interface modules 525 may be through semiconductor metal layers, substrate to substrate wiring, or circuit card traces or wires connecting the semiconductor devices.

The memory module 510 stores software instructions and data. The processor module 505 executes the software instructions and manipulates the data as is well know to those skilled in the art. In one embodiment, memory module 510 stores and the processor module 505 executes one or more software processes comprising the verification value module 405, selection module 410, validation module 415, generation count module 420, and communication module 425 of FIG. 4.

In one embodiment, the backplane interface module 520 communicates with a backplane 115 such as the backplane 115 of FIG. 1. The first I2C interface module 525a may communicate with a first communication channel 305a such as the first communication channel 305a of FIG. 3 and second I2C interface module 525b may communicate with a second communication channel 305b such as the second communication channel 305b of FIG. 3, wherein the first and second communication channels 305a, 305b are configured as Inter-IC buses.

The processor module 505 may communicate with a first redundant memory 210a such as the first redundant memory 210a of FIGS. 2 and 3 through the bridge module 515 and the first I2C interface module 525a. Alternatively, the processor module 505 may receive data from a second redundant memory 210b such as the second redundant memory 210b of FIG. 3 transmitted by a second controller module 205b such as the second controller module 205b of FIG. 3 through the second I2C interface module 525b and the bridge module 515. In one embodiment, the processor module 505 communicates with a management module 105 such as the management module 105 of FIG. 1 through the bridge module 515 and the backplane interface module 520.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
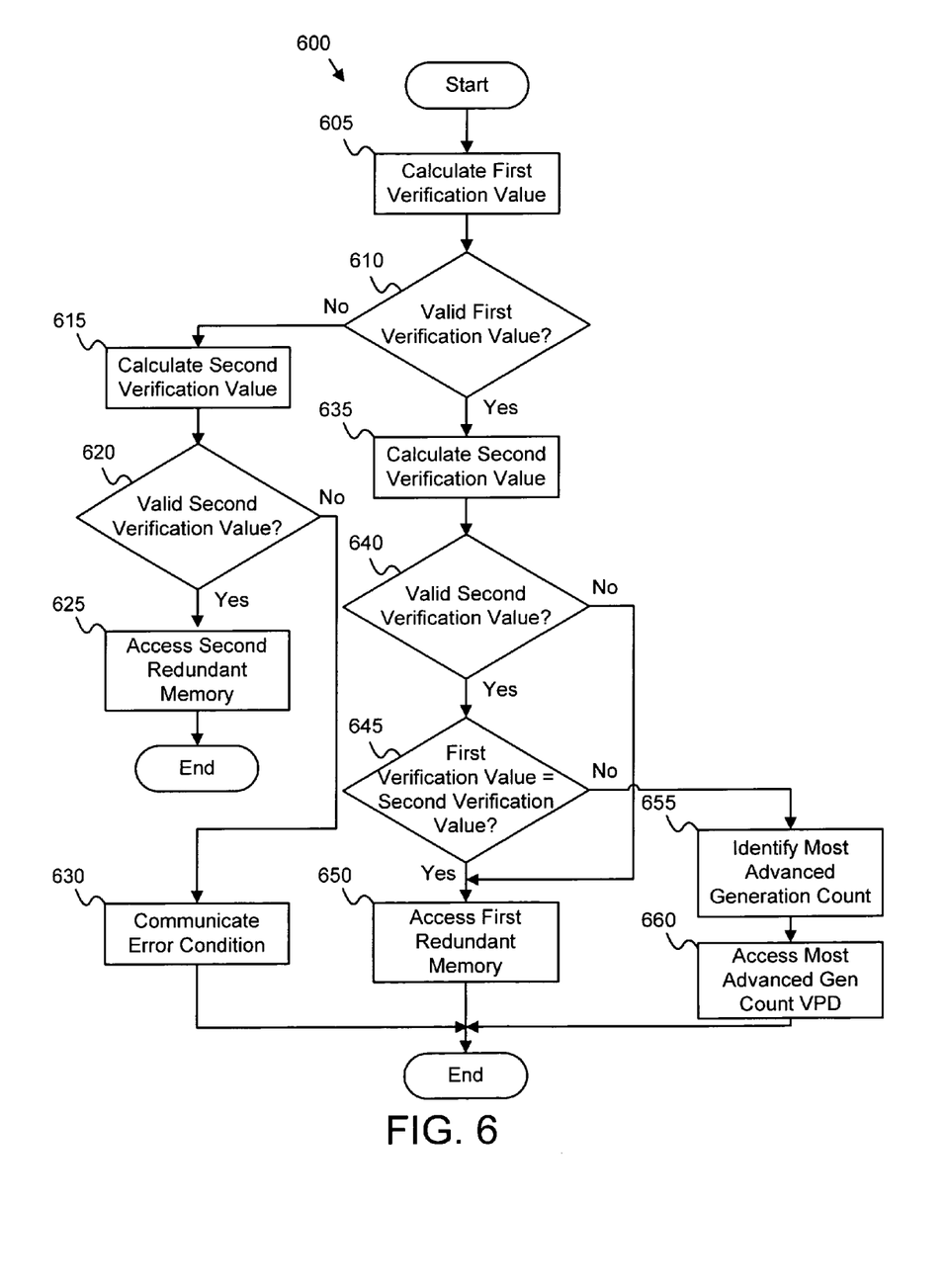
FIG. 6 is a schematic flow chart diagram illustrating one embodiment of a redundant data access method of the present invention.

FIG. 6 is a schematic flow chart diagram illustrating one embodiment of a redundant data access method 600 of the present invention. The method 600 substantially includes the steps necessary to carry out the functions presented above with respect to the operation of the described apparatus 400 and systems 100, 200, 300 of FIGS. 1-4. The method 600 may further reference elements of FIGS. 1-5.

The method 600 begins and a verification value module 405 calculates 605 a first verification value for a first redundant memory 210a. In one embodiment, a controller module 205 executing the verification value module 405 reads the contents of the first redundant memory 210a and calculates 605 the verification value from the contents. In a certain embodiment, the verification value module 405 calculates 605 a checksum from the contents.

In one embodiment, a validation module 415 determines 610 if the first verification value is valid. In a certain embodiment, a controller module 205 such as the controller module 205 of FIG. 2 or the first controller module 205a of FIG. 3 reads a first stored value from the first redundant memory 210a. The first stored value may be verification value calculated and stored when data is written to the first redundant memory 210a. The validation module 415 may compare the first verification value with the first stored value, and determine 610 the first verification value is valid if the first verification value and the first stored value are equivalent.

In a certain embodiment, the validation module 415 determines 610 the first verification value is not valid if the verification value module 405 is unable to read the first redundant memory 210a. A communication module 425 may communicate a read failure notice if the verification value module 405 is unable to read the first redundant memory 210a. In one embodiment, the communication module 425 communicates 630 the notice to the management module 105 of FIG. 1.

If the validation module 415 determines 610 the first verification value is not valid, the verification value module 405 calculates 615 a second verification value for a second redundant memory 210b. In one embodiment, a first controller module 205a such as the first controller module 205a of FIG. 3 directs a second controller module 205b such as the second controller module 205b of FIG. 3 to read the contents of the second redundant memory 210b and transmit the contents to the first controller module 205a. The first controller 205a may calculate 615 the second verification value from the contents.

In one embodiment, a validation module 415 determines 620 if the second verification value is valid. In a certain embodiment, the controller module 205 reads a second stored value from the second redundant memory 210b. Alternatively, the first controller module 205a of FIG. 3 may direct the second controller module 205b of FIG. 3 to read the second stored value of the second redundant memory 210b and communicate the second stored value to the first controller module 205a. The second stored value may be verification value calculated and stored when data is written to the second redundant memory 210b. The validation module 415 may compare the second verification value with the tow second stored value, and determine 620 the second verification value is valid if the second verification value and the second stored value are equivalent.

In a certain embodiment, the validation module 415 determines 620 the second verification value is not valid if the verification value module 405 is unable to read the second redundant memory 210b. The communication module 425 may communicate the read failure notice if the verification value module 405 is unable to read the second redundant memory 210a.

If the validation module 415 determines 620 the second verification value is not valid, the communication module 425 may communicate 630 an error condition notice and the method 600 terminates. For example, the error condition notice may indicate the redundant memories 210 could not be successfully accessed.

If the validation module 415 determines 620 the second verification value is valid, a selection module 410 accesses 625 the second redundant memory 210b and the method 600 terminates. In one embodiment, the communication module 425 communicates a notice that the redundant data was successful accessed.

If the validation module 415 determines 610 the first verification value is valid, the verification value module 405 calculates 635 the second verification value for the second redundant memory 210b. The validation module 415 determines 640 if the second verification value is valid. In a certain embodiment, the validation module 415 determines 640 the second verification value is not valid if the verification value module 405 is unable to read the second redundant memory 210b. The communication module 425 may communicate the read failure notice if the verification value module 405 is unable to read the second redundant memory 210a.

If the validation module 415 determines 640 the second verification value is not valid, the selection module 410 accesses 650 the first redundant memory 210a and the method 600 terminates. In one embodiment, the communication module 425 communicates the notice that the data is accessed.

If the validation module 415 determines 640 the second verification value is valid, the selection module 410 determines 645 if the first verification value is equivalent to the second verification value. If the first verification value is equivalent to the second verification value, the selection module 410 accesses 650 the first redundant memory 210a and the method 600 terminates. In one embodiment, the communication module 425 communicates the notice that the VPD was retrieved.

If the selection module 410 determines 645 the first verification module is not equivalent to the second verification module, the selection module 410 may identify 655 a most advanced generation count of the first and second redundant memories 210a, 210b. In one embodiment, the selection module 410 reads a first generation count from the first redundant memory 210a and a second generation count from the second redundant memory 210b. The selection module 410 may identify 655 the most advanced generation count as the generation count with the greatest numerical value.

In one embodiment, the selection module 410 accesses 660 the redundant memory 210 with the most advanced generation count and the method 600 terminates. For example, if the first generation count is seven (7) and the second generation count is six (6), the selection module 410 accesses 660 the first redundant memory 210a. The method accesses valid, consistent data from redundant memories 210. In one embodiment, the communication module 425 communicates the notice of the status of the data access.

Figure 7:
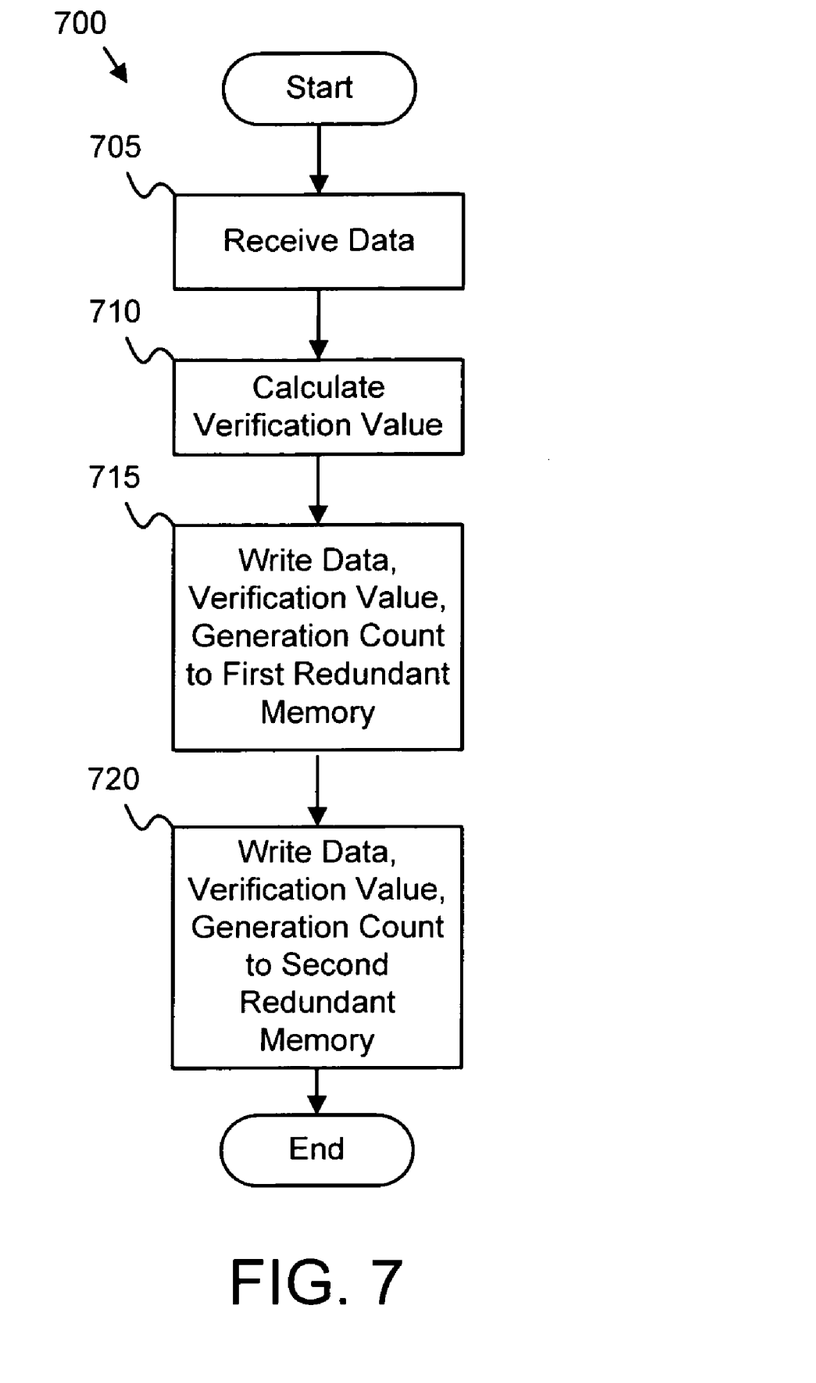
FIG. 7 is a schematic flow chart diagram illustrating one embodiment of a redundant data write method in accordance with the present invention.

FIG. 7 is a schematic flow chart diagram illustrating one embodiment of a redundant data write method 700 in accordance with the present invention. The method 700 substantially includes the steps necessary to carry out the functions presented above with respect to the operation of the described apparatus 400 and systems 100, 200, 300 of FIGS. 1-4. The method 700 may further reference elements of FIGS. 1-5.

The method 700 begins and in one embodiment, a controller module 205 such as the controller module 205 of FIG. 2 or the first controller module 205a of FIG. 3 receives 705 data.

In a certain embodiment, the controller module 205 receives 705 the data from the management module 105 of FIG. 1. The controller module 205 calculates 710 a verification value for the data. In one embodiment, the controller module 205 calculates a checksum.

In one embodiment, the controller module 205 further writes 715 the data and the verification value to a first redundant memory 210a. The verification value may be a first stored value. In a certain embodiment, the controller module 205 also writes 715 a generation count to the first redundant memory 210a. The generation count may be an initial value such as zero. The generation count may also be an incremented generation count.

In one embodiment, the controller module 205 further writes 720 the data and the verification value to a second redundant memory 210b. The verification value may be a second stored value. The controller module 205 may also write the generation count to the second redundant memory 210a.

In a certain embodiment, the controller module 205 is the first controller module 205a of FIG. 3 and communicates the data, verification value, and generation count to a second controller module 205b such as the second controller module 205b of FIG. 3. The first controller module 205a may further direct the second controller module 205b to write 720 the data, verification value, and generation count to the second redundant memory 210b. The method 700 writes the data with the verification value to the redundant memories 210.

The embodiment of the present invention accesses data including VPD from redundant memories 210. In addition, the embodiment of the present invention validates the data and assures the data's consistency. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to access redundant data, the apparatus comprising:
   a verification value module comprising executable code stored on a semiconductor device, executed by a processor, and configured to calculate a first verification value for a first redundant memory and a second verification value for a second redundant memory, wherein the first redundant memory comprises a first generation count and the second redundant memory comprises a second generation count;
   a validation module comprising executable code stored on the semiconductor device, executed by the processor, and configured to validate the first and second verification values; and
   a selection module comprising executable code stored on the semiconductor device, executed by the processor, and configured to access the first redundant memory if the first verification value is equivalent to the second verification value, else identify and access the redundant memory with a most advanced generation count if the first and second verification values are valid and are not equivalent, else access the first redundant memory if the first verification value is valid and the second redundant memory is not in communication, else access the second redundant memory if the second verification value is valid and the first redundant memory is not in communication.

2. The apparatus of claim 1, further comprising a generation count module comprising executable code stored on the semiconductor device, executed by the processor, and configured to increment each generation count when each redundant memory is updated.

3. The apparatus of claim 1, wherein the selection module is further configured to access the second redundant memory if the first redundant memory has an invalid verification value and the second redundant memory has a valid verification value else to access the first redundant memory if the first redundant memory has a valid verification value and the second redundant memory has an invalid verification value.

4. The apparatus of claim 1, further comprising a communication module comprising executable code stored on the semiconductor device, executed by the processor, and configured to communicate the status of the redundant memory access.

5. A system to access redundant data, the system comprising:
   a blade center configured to mount a plurality of blades;
   a blade mounted in the blade center and comprising a first and second redundant memory, wherein the first redundant memory comprises a first generation count and the second redundant memory comprises a second generation count, and a controller module, the controller module comprising:
      a verification value module comprising executable code stored on a semiconductor device, executed by a processor, and configured to calculate a first verification value for the first redundant memory and a second verification value for the second redundant memory; and
      a validation module comprising executable code stored on the semiconductor device, executed by the processor, and configured to validate the first and second verification values;
      a selection module comprising executable code stored on the semiconductor device, executed by the processor, and configured to access the first redundant memory if the first verification value is equivalent to the second verification value, else identify and access the redundant memory with a most advanced generation count if the first and second verification values are valid and are not equivalent, else access the first redundant memory if the first verification value is valid and the second redundant memory is not in communication, else access the second redundant memory if the second verification value is valid and the first redundant memory is not in communication.

6. The system of claim 5, wherein the selection module is further configured to access the second redundant memory if the first redundant memory has an invalid verification value and the second redundant memory has a valid verification value else to access the first redundant memory if the first redundant memory has a valid verification value and the second redundant memory has an invalid verification value.

7. The system of claim 5, the controller module further comprising a communication module comprising executable code stored on the semiconductor device, executed by the processor, and configured to communicate the status of the vital product data access.

8. A program of executable code stored on a semiconductor device and executed by a processor to perform an operation to access redundant data, the operation comprising:

calculating a first verification value for a first redundant memory, the first redundant memory comprising a first generation count;

calculating a second verification value for a second redundant memory, the second redundant memory comprising a second generation count;

validating the first and second verification values;

accessing the first redundant memory if the first verification value is equivalent to the second verification value;

else identifying and accessing the redundant memory with a most advanced generation count if the first and second verification values are valid and are not equivalent;

else accessing the first redundant memory if the first verification value is valid and the second redundant memory is not in communication;

else accessing the second redundant memory if the second verification value is valid and the first redundant memory is not in communication.

9. The program of claim 8, further comprising an operation to increment each generation count when each redundant memory is updated.

10. The program of claim 8, further comprising an operation to access the second redundant memory if the first redundant memory has an invalid verification value and the second redundant memory has a valid verification value else to access the first redundant memory if the first redundant memory has a valid verification value and the second redundant memory has an invalid verification value.

11. The program of claim 8, further comprising an operation to calculate a verification value for data, write the data, the verification value, and a generation count to the first redundant memory as the data, the first verification value, and the first generation count respectively, and write the data, the verification value, and the generation count to the second redundant memory as the data, the second verification value, and the second generation count respectively.

12. The program of claim 8, further comprising an operation to communicate the status of the redundant memory access.

13. The program of claim 8, wherein the verification value is a checksum.

14. A method for deploying computer infrastructure, comprising integrating computer-readable code into a computing system, wherein the code in combination with the computing system performs the following:

calculating a first verification value for a first redundant memory, the first redundant memory comprising a first generation count;

calculating a second verification value for a second redundant memory, the second redundant memory comprising a second generation count;

validating the first and second verification values;

accessing the first redundant memory if the first verification value is equivalent to the second verification value;

else identifying and accessing the redundant memory with a most advanced generation count if the first and second verification values are valid and are not equivalent;

else accessing the first redundant memory if the first verification value is valid and the second redundant memory is not in communication;

else accessing the second redundant memory if the second verification value is valid and the first redundant memory is not in communication.

* * * * *